J. MULFORD.
FILTER FOR THE FEED-WATER OF CONDENSING STEAM-ENGINES

No. 182,464. Patented Sept. 19, 1876.

Witnesses
John Becker
Thos. Haynes

Jeremiah Mulford
by his Attorneys
Brown & Allen

UNITED STATES PATENT OFFICE.

JEREMIAH MULFORD, OF NEW YORK, N. Y., ASSIGNOR OF PART OF HIS RIGHT TO CORNELIUS H. DELAMATER AND GEORGE H. ROBINSON, OF SAME PLACE.

IMPROVEMENT IN FILTERS FOR THE FEED-WATER OF CONDENSING STEAM-ENGINES.

Specification forming part of Letters Patent No. 182,464, dated September 19, 1876; application filed August 16, 1876.

*To all whom it may concern:*

Be it known that I, JEREMIAH MULFORD, of the city, county, and State of New York, have invented an Improved Filter for the Feed-Water of Condensing Steam-Engines; and I do hereby delare that the following is a full, clear, and exact description of the same, reference being had to the accompanying drawing, which forms part of this specification.

It is well known that the grease which passes out of condensing-engines with the condensed steam into the hot wells produces very injurious effects when passed into the boilers of such engines. It is therefore very desirable to effect the removal of the grease, a result which has been the most successfully reached by filtering the water during its passage from the hot well to the feed-pump.

Many of the filters designed for this purpose are, however, complicated, expensive in construction and repairs, inconvenient in use, and difficult to clean when they become fouled with accumulated impurities.

The object of my invention is the production of a simple, cheaply-constructed, and efficient filter for the feed-water of condensing-engines, and one which may be cleaned with great facility whenever its proper working is interfered with by the accumulation of impurities therein.

The invention consists in a peculiarly-constructed filter for the purpose named, the construction and operation of which is hereinafter set forth.

Figure 1:
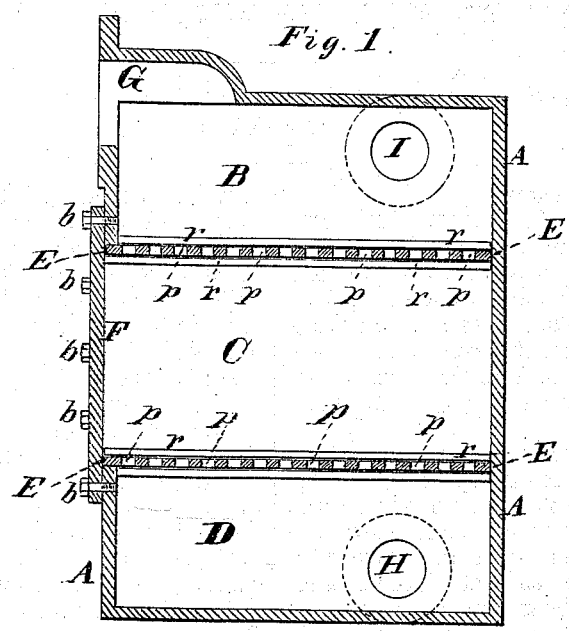
Figure 2:
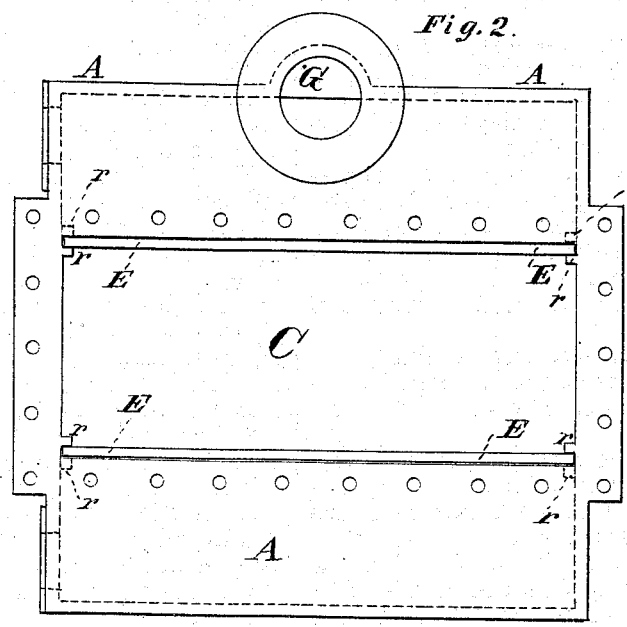

Figure 1 in the accompanying drawing represents a central vertical section of my improved filter, and Fig. 2 a front view of the filter with the cover removed.

The box or case A of the filter has the form of a parallelopipedon, and its interior is divided into three chambers, B C D, by the diaphragms E, the said diaphragms being placed in a horizontal position, and perforated as shown at *p*, Fig. 1. Said diaphragms E are preferably made of zinc, and are removable, being slid in and out between, and, when in position, supported by, ribs *r*, formed on the inner side walls of the box or case A. The box or case A is made with a rectangular opening in the front side, through which the interior of the contained chambers may be reached, and through which the diaphragms E may be removed and replaced, said rectangular opening being closed, when the filter is in use, by the rectangular cover F, Fig. 1, said cover being attached to the case by bolts *b*. The filtering material (preferably sponge) is placed in the chamber C, which is intermediate between the upper chamber B and the lower chamber D.

The impure water of condensation enters the upper chamber through the passage G, passes through the perforations in the upper diaphragm; thence through the filtering material in the chamber C; thence through the perforations in the lower diaphragm into the chamber D, and thence, through the passage H in the side of the case A, to the feed-pump. (Not shown in the drawing.) During its passage through the filter the water is thoroughly freed from grease and other oily matters which are retained in the chamber C.

The filter is cleaned with great facility by removing the cover F and taking out the filtering material and the diaphragms E, as hereinbefore described.

The filter thus constructed will not, under ordinary circumstances, get so foul as to seriously decrease its efficiency during a voyage of considerable duration; but, in case it should become clogged, provision is made for the passage of water from the chamber B to the pipe which leads to the feed-pump by attaching to an opening, I, Fig. 1, in the side of the chamber B, a branch pipe, (not shown in the drawing, but communicating with the feed-pipe,) the passage of the water through said branch pipe being controlled by a suitable valve.

A filter is thus obtained which possesses in a high degree all the valuable qualities desired in an apparatus for purifying the water of condensation from steam-engines.

I claim—

The combination of the three chambers B C D, having the openings G H I, the perforated sliding diaphragms E E, forming removable partitions between the said chambers, and the removable cover F, applied to the chamber C, the whole arranged substantially as herein described.

JEREMIAH MULFORD.

Witnesses:
HENRY T. BROWN,
BENJAMIN W. HOFFMAN.